United States Patent

[11] 3,548,853

| [72] | Inventor | Robert B. McEuen |
| | | Moraga, Calif. |
| [21] | Appl. No. | 739,755 |
| [22] | Filed | June 25, 1968 |
| [45] | Patented | Dec. 22, 1970 |
| [73] | Assignee | The Rucker Company |
| | | a corporation |

[54] ELECTRO VISCOUS FLUID RECTIFIER
9 Claims, 3 Drawing Figs.

[52] U.S. Cl.......................................... 137/81.5, 310/10
[51] Int. Cl........................................... F15c 1/04
[50] Field of Search.............................. 137/81.5, 2, 14, 251; 103/1M, 1E; 310/10, 5

[56] References Cited
UNITED STATES PATENTS

| 2,727,859 | 12/1955 | Freeborn.................. | 103/1E |
| 3,267,859 | 8/1966 | Jutila...................... | 103/1E |
| 3,375,842 | 4/1968 | Readet.................... | 137/815 |
| 3,390,693 | 7/1968 | Ziemer et al............. | 137/815 |
| 3,396,662 | 8/1968 | Okress.................... | 103/1E |
| 3,405,728 | 10/1968 | Dexter.................... | 137/251 |
| 3,416,549 | 12/1968 | Chaney et al............ | 137/815 |

*Primary Examiner*—Samuel Scott
*Attorney*—Lothrop & West

ABSTRACT: An electroviscous-fluid rectifier for flow of electroviscous fluid in a conduit has a grid extending across the conduit, the grid being effective to promote turbulent flow in the fluid. A second grid extending across the conduit promotes laminar flow in the fluid. The second grid is disposed on one side of the first grid and a voltage difference is produced between the first grid and the second grid.

INVENTOR.
ROBERT B. McEUEN

ELECTRO VISCOUS FLUID RECTIFIER

The invention relates to means for controlling the flow of an electroviscous fluid in a conduit. A related structure is disclosed in the copending application of Richard C. Fisher entitled "Valve For Electroviscous Fluids" and assigned to the assignee hereof. The Fisher application has a filing date of Jun. 25, 1968 and has Ser. No. 739,731.

In the Fisher application it is pointed out that, contrary to previous teachings in the literature, the control of electroviscous fluid in a conduit can be accomplished by providing an electrical field, the direction of which extends along or parallel to the axis of the conduit; that is, parallel to the direction of flow in the conduit. This property is apparently contingent upon the flow of the electroviscous fluid being at least in some measure nonlaminar or turbulent.

It is therefore an object of the invention to provide a rectifier for electroviscous fluid utilizing the indicated field and turbulence relationship.

Another object of the invention is to provide a rectifier for electroviscous fluid which is effective to govern the flow of electro fluid in a conduit to provide greater freedom of flow in one direction than in the opposite direction.

Another object of the invention is to provide a rectifier for electroviscous fluid capable of use in connection with a pulsing or pumping arrangement.

Another object of the invention is to provide an effective way for rectifying flow in electroviscous fluid.

Another object of the invention is in general to provide an improved electroviscous-fluid rectifier.

Other objects together with the foregoing are attained in the embodiments of the invention described in the accompanying description and illustrated in the accompanying drawings, in which.

While the rectifier of the invention can be incorporated in a number of different ways, it has with success been incorporated in the forms disclosed herein.

Figure 1:
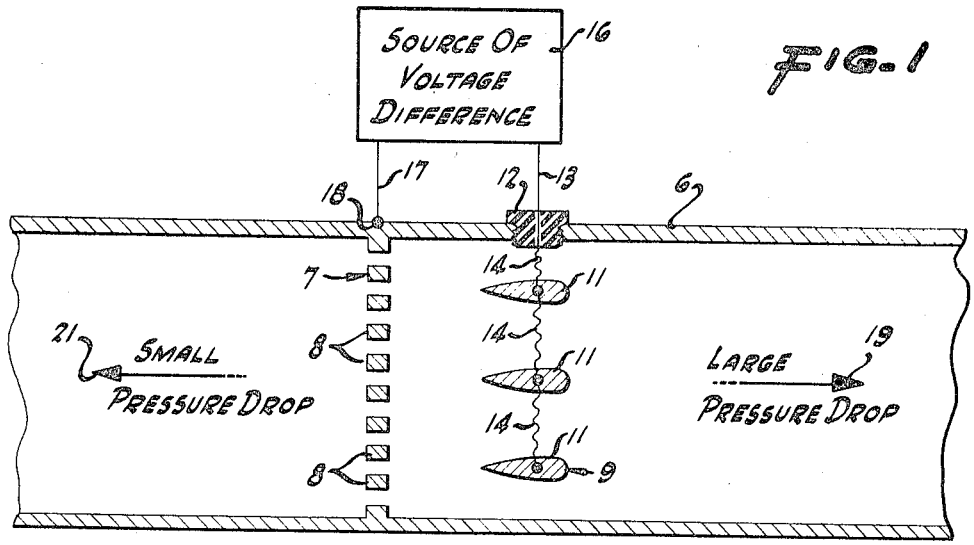
FIG. 1 is a diagrammatic cross section along the length of a conduit in which electroviscous fluid flows, a rectifier pursuant to the present invention being incorporated therewith.

Particularly with respect to the arrangement of FIG. 1, there is provided a conduit 6 preferably of metallic or suitable electrically conducting material usually of circular cross section and provided with a first electrode means 7 in the nature of a grid extending transversely across the conduit normal to the direction of fluid flow therein. The grid 7 is preferably inclusive of a plurality of individual members 8 each of which is like the others. Each member is conveniently a bar extending across the conduit and merging as its ends with the walls of the conduit for electrical continuity. In cross section in the direction of flow or in a plane normal to the length of the individual bar, the bar has a nonstreamlined configuration, preferably rectangular.

The bars 8, having a nonstreamlined or angular and planar configuration, are effective even at relatively low fluid flow rates to produce local eddy currents and thus turbulence in the electrofluid flowing within the conduit 6. The amount of turbulence and its general character are dependent not only upon the cross-sectional configuration of the bars but also upon the spacing and number of the bars and their cross-sectional size or dimensions.

Under any circumstances, the first means or grid 7 is effective to produce turbulence in the flowing electrofluid, the particular effect of the turbulence being noted downstream of the grid for either direction of flow. Stated differently, if fluid having substantially laminar flow travels over the grid, then downstream of the grid the flow is no longer laminar, but rather is turbulent. Since the grid bars 8 are symmetrical about a transverse plane, it is immaterial in which direction the flow occurs. Laminar flow from the left in FIG. 1 toward the right therein produces turbulence on the right-hand side of the grid, whereas flow of a laminar nature from the right-hand side toward the left-hand side of the conduit produces turbulent flow on the left-hand side of the grid. Even if the flow approaching the grid from either direction is already of a turbulent nature, the grid structure effectively increases the amount of the turbulence so that there is a difference in the turbulence on the upstream side of the grid from that on the downstream side under all circumstances met with in practice.

Pursuant to the invention, there is provided on one side of the grid 7 a second means in the nature of a second grid 9 inclusive of a plurality of bars 11 arranged generally transversely of the conduit 6 parallel to the plane of the grid 7 and spaced therefrom. Each of the bars 11, however, is made as nearly streamlined or as smooth as possible to avoid the creation of eddy currents and thus the creation of turbulence in the fluid flowing around the bars 11. The bars 11 are such in number, size and particularly configuration that although they extend across the conduit parallel in general with the extent of the bars 8, there is as little as possible disturbance to the flow by the bars 11.

Stated differently, the bars 11 are not symmetrical in flow direction so that flow from the right toward the left in the conduit is very little disturbed. Flow thus passing over the bars 11 to encounter the bars 8 is still generally of a laminar nature or if already turbulent does not have its turbulence particularly changed or increased. It is true, of course, that flow from the left to the right in the conduit across the bars 11 is somewhat disturbed and eddies are created so that there is then some turbulence to the right of the bars 11. However, the amount of turbulence due to the bars 11 is considerably less at all practical flow rates from the turbulence due to the rectangular or planar and cornered bars 8.

These flow properties are made use of in the rectifier. Opposite the second grid 9 the wall of the conduit 6 is provided with an electrically insulating plug 12 conveniently screwed in place and passing an electrical conductor 13 which extends by connectors 14 to each of the bars 11. These bars are electrical conductors themselves but are at their ends protected from or are insulated from the walls of the conduit 6 by insulation similar to the plug 12. The conductor 13 extends to a source 16 of voltage difference, the source having another conductor 17 joined as at 18 to the conducting material of the conduit 6. If the conduit itself is not to be included in the circuit, the conductor 17 is connected electrically to each of the bars 8. The effect of the connections is to provide a different voltage on the bars 8 than is provided on the bars 11. The voltage difference between the bars 8 and 11 establishes an electrical field having its general direction along the axis of the conduit 6 or extending between the bars 8 and 11.

The number of the bars 8 and their locations and the number of the bars 11 and their locations may be varied substantially, but in any case the direction of the field between the individual bars 8 and the individual bars 11 is generally along the axis of the conduit. True, as pointed out in the above-identified Fisher application, an effective field can be established even with some transverse component but with the resultant of the transverse and axial components extending generally along the line of the axis. Stated differently, the principal or resultant field direction does not depart a large amount from a true axial direction.

With an arrangement as described and with an axial field established within electroviscous fluid in the conduit 6, when the fluid flow is in the direction of the arrow 19, then the fluid first passes over the first member 7 and is made turbulent. The resulting turbulent flow then between the first member 7 and the second member 9 in combination with the electrical field between the members 7 and 9 restricts the freedom of flow and there is a relatively large pressure drop across the first and second grids when flow is toward the right in FIG. 1.

On the other hand, when flow is in the opposite direction from the right hand toward the left hand in FIG. 1 or in the direction of the arrow 21, then the fluid flowing from the right over the streamlined bars 11 of the second member 9 is not particularly disturbed and laminar flow persists in the area or region between the bars 11 and the bars 8. Since there is then virtually no turbulence or no substantially increased turbulence between the bars 11 and the bars 8, the electrical field between them is not effective to produce any substantial inhibition of the flow, so that the pressure drop between the second member 9 and the first member 7 is relatively small. Truly enough, there is substantial turbulence to the left of the first member 7 within the conduit, but such turbulent flow is then outside of the major portion of the electrical field between the bars 8 and the bars 11.

With this arrangement it is observed that flow from left to right is substantially inhibited and is characterized by a large pressure drop, whereas flow from the right to the left is virtually uninhibited and is characterized by a small pressure drop. This difference in pressure drop with flow direction is in fact a rectification and the arrangement just described is consequently referred to as an electroviscous-fluid flow rectifier.

Figure 2:
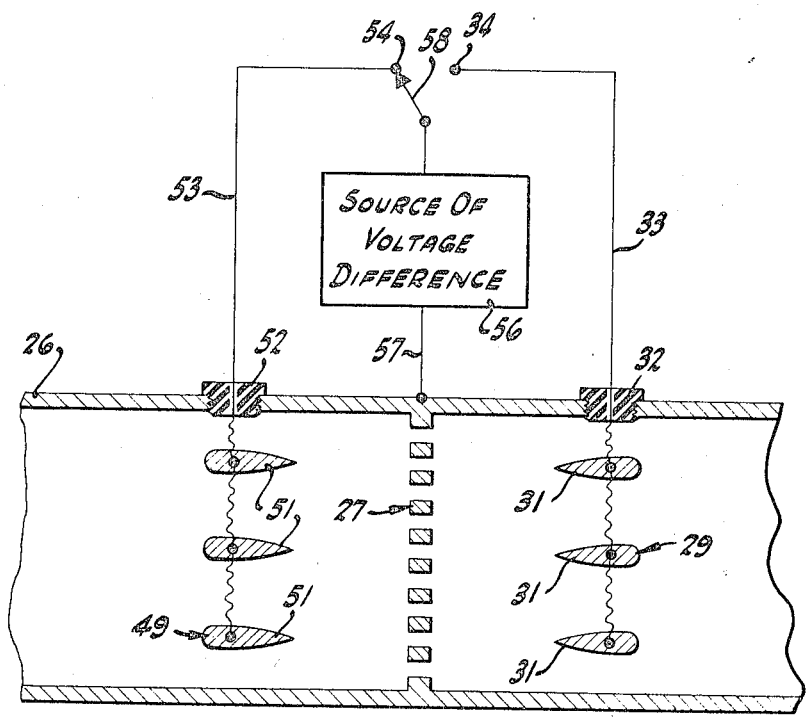
FIG. 2 is a modified form of rectifier in which flowing electrofluid in a conduit can be controlled as to direction of rectification.

The direction of easy flow in the FIG. 1 arrangement is singular, but by providing an arrangement as shown in FIG. 2 the direction of easy flow can be selected for either hand.

In FIG. 2 the electrically conducting conduit 26 is identical with the conduit of FIG. 1 in general and is provided with an entirely similar first member 27 inducing turbulent flow in fluid passing over it along the axis of the conduit in either direction. The conduit 26 on one side of the first grid 27 has a second grid 29 made up of bars 31 just like the bars 11 and connected through an insulator 32 by a conductor 33 to a terminal 34. On the opposite side of the first member 27 there is a third member 49 made up of streamlined bars 51 exactly like the members 31 except facing in the opposite direction. Preferably, the bars 51 are spaced equally far from the first member 27 but on the opposite side thereof from the second member 29. In a similar fashion, the members 51 are insulated from the conduit 26 and are electrically connected together. An insulator 52 in the conduit carries a conductor 53 to a terminal 54.

A source 56 of voltage difference is joined by a conductor 57 to the conduit 26 and especially to the first member or first grid 27 and has a switching conductor 58 which can be joined to the terminal 34 or, alternatively, to the terminal 54. When the conductor 53 is joined to the terminal 34, there is an electrical field in the direction of the axis of the conduit but only between the first grid 27 and the second grid 29. On the other hand, when the switch member 58 is joined to the terminal 54 there is no electrical field between the first grid 27 and the second grid 29, but there is an electrical field between the first grid 27 and the third member or grid 49. In both instances the electrical fields are parallel with the axis of the conduit. With this arrangement fluid flowing from left to right is subjected to a large pressure drop if the second grid 29 is the energized one, or the flow from right to left is subjected to a large pressure drop provided only that the switch 58 contact the terminal 54 so that the field exists only between the first grid 27 and the third grid 49.

Figure 3:
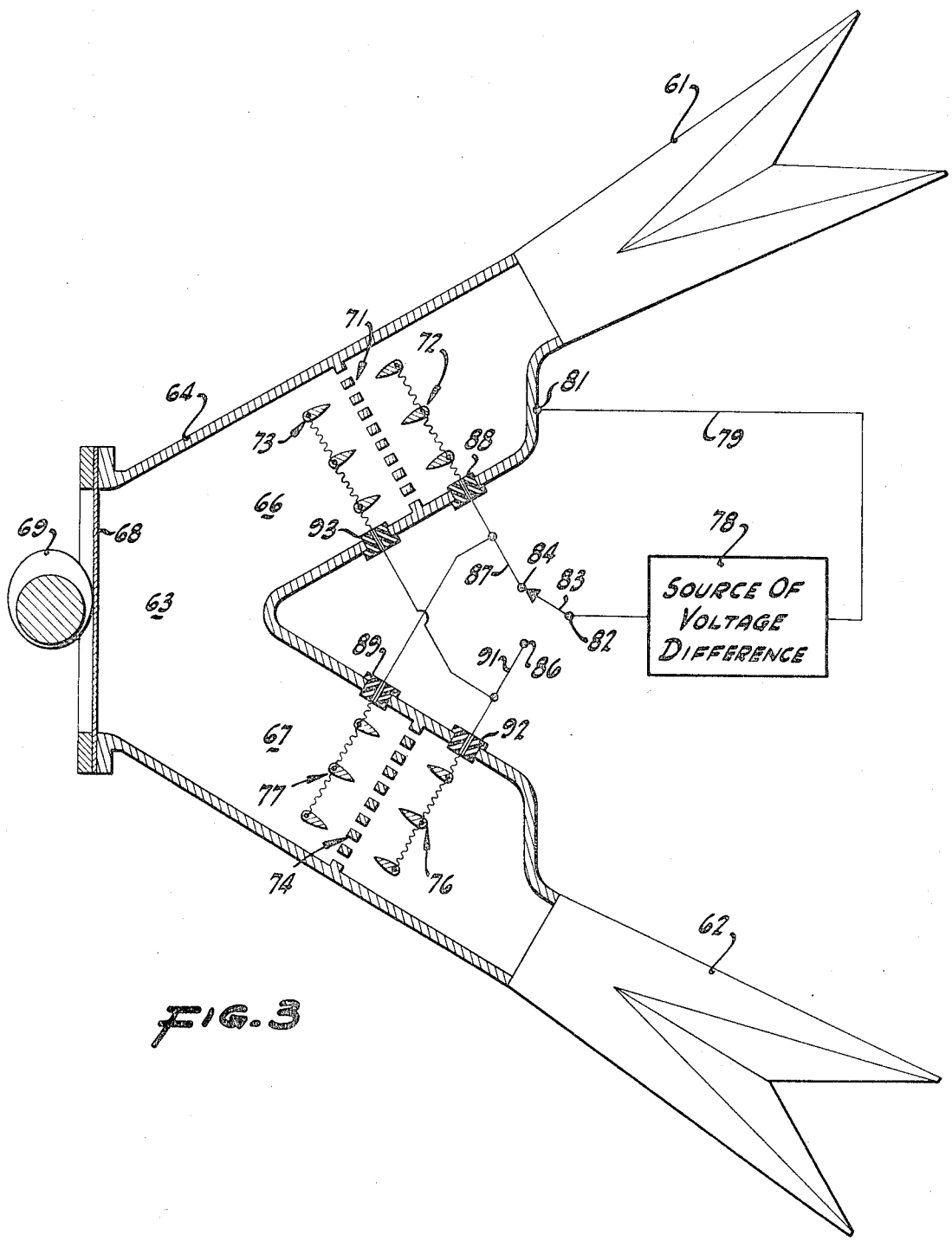
FIG. 3 is a diagrammatic showing of electrofluid rectifiers pursuant to the invention incorporated in a pulsing mechanism especially for use with a heart pump.

Rectification in one direction, as attained in the FIG. 1 structure, and rectification in either of two directions, as attained in the FIG. 2 construction, can be made use of in a device primarily for use in a heart pump as shown in FIG. 3.

The arrangement of FIG. 3 is designed to provide appropriate flow so as alternately to expand and contract a pair of flexible bellows 61 and 62 which in turn control the pulsations in an appropriate heart pump, usually one which is implanted, the mechanism 61 and 62 being of a size and nature to be implanted in the body.

In this arrangement there is provided a chamber 63 enclosed by electrically conducting walls 64 to provide a pair of substantially identical conduits 66 and 67 arranged in mirror symmetry about a center line. The conduit 66 is joined to the bellows 61, whereas the conduit 67 is joined to the bellows 62. The chamber 63 is likewise bounded by a flexible diaphragm 68 pulsed by a suitable rotating cam 69 or comparable device affording fluctuating pressure at a periodic rate within the chamber 63 when the chamber is filled with electroviscous fluid.

Extending across the conduit 66 is an electrically conducting turbulence grid 71 flanked on either side by a nonturbulent grid 72 and another nonturbulent grid 73, the grid 71 being referred to as a first member, the grid 72 being referred to as a second member, and the grid 73 being referred to as a third member.

Quite similarly, the conduit 67 is provided with a turbulence grid 74 referred to as a fourth member, a nonturbulent grid 76 referred to as a fifth member and another nonturbulent grid 77 on the other side and facing in the opposite direction and referred to as a sixth member. There is a source 78 of voltage difference, one conductor 79 from which is connected at a point 81 to the conducting material 64 so that the turbulence grids 71 and 74 are always provided with a set or fixed voltage. The other terminal 82 of the source 78 is connected by a switch 83 to a terminal 84 or to a terminal 86. The terminal 84 has a conductor 87 extending to the grid 72 and also extending to the grid 77, there being appropriate insulators 88 and 89 so that the grids 72 and 77 can simultaneously be given a voltage different from the voltage on the grids 71 and 74. Quite similarly, the terminal 86 is joined by a conductor 91 to the grid 76 through an insulator 92 and also to the grid 73 through an insulator 93. Thus the grids 73 and 76 can simultaneously be given a voltage different from that on the grids 71 and 74, but the grids 72 and 73 are never energized at the same time nor are the grids 76 and 77 energized at the same time.

With this arrangement, when there is an increase in pressure in the chamber 63 and when the grids 71 and 73 are energized along with the grids 74 and 76, a situation is created in which flow through the conduit 66 toward the right in FIG. 3 is relatively easy, whereas flow toward the right in the conduit 67 is relatively difficult. Thus the tendency of the increased pressure in the chamber 63 is to induce flow into the bellows 61 and to expand such bellows. When the pressure in the chamber 63 is later reduced, back flow from the bellows 61 is not easy, so there tends to be a net fluid transfer to the bellows 61. The bellows thus can be "pumped up." During this time the bellows 62 is deflating or is being "pumped down" since the electrical connections permit easy out flow and difficult in flow. When the connections are reversed the effect on the bellows is reversed. When a succession of chamber pulses has accomplished substantially all of the work desired, the contact switch 83 is reversed and flow reverses as to the two bellows. In this fashion the bellows 61 and 62 are appropriately timed to operate upon a plurality of chamber pulses and can be used synchronously to operate a heart pump mechanism.

The sources of voltage difference can be any such sources effective to produce the desire electroviscous response and in practice range from direct current sources to alternating current sources in which the frequency is below about 50,000 cycles per second and often is below about 20,000 cycles per second. The alternating current may also have a direct current component, but does not necessarily have such a component.

I claim:

1. An electroviscous-fluid rectifier comprising a conduit extending along an axis, means for driving electroviscous -fluid axially along said conduit, a first means extending across one portion of said conduit for making turbulent said electroviscous fluid driven axially through said first means, a second means extending across a second portion of said conduit spaced axially from said first means for promoting laminar flow of said electroviscous fluid driven through said second means axially toward said first means, and means for establishing a voltage difference between said first means and said second means in an amount to establish an electric field extending axially of said conduit to inhibit axial flow of said turbulent electroviscous fluid between said first means and said second means.

2. An electroviscous-fluid rectifier as in claim 1 in which said first means and said second means are grids having parallel bars the bars in each grid being spaced-apart from other bars in said grid in a direction transverse to said axis.

3. An electroviscous-fluid rectifier as in claim 1 in which said first means includes a member having a shape to induce eddies in said electroviscous fluid flowing axially through said member in either direction.

4. An electroviscous-fluid rectifier as in claim 1 in which said second means includes a member having a shape to induce laminar flow of said electroviscous fluid flowing axially through said second means toward said first means.

5. An electroviscous-fluid rectifier as in claim 1 in which said first means includes a plurality of members spaced apart in a direction transverse to said axis, and said second means includes a plurality of members spaced-apart from each other and each being disposed substantially coplanar with a corresponding one of the members of said first means and being spaced axially therefrom.

6. An electroviscous-fluid rectifier as in claim 1 in which said first means includes a member of rectangular cross section in planes parallel to said axis.

7. An electroviscous-fluid rectifier as in claim 1 in which said second means includes a member of streamlined cross section in planes parallel to said axis, the streamlining being for flow toward said first means.

8. An electroviscous-fluid rectifier as in claim 1 including a third means for promoting laminar flow in said electroviscous fluid flowing in said conduit axially toward said first means, said third means being axially spaced-apart from said first means and being located on the opposite side of said first means from said second means, and means for selectively establishing a voltage difference between said first means and said second means or between said first means and said third means.

9. An electroviscous-fluid rectifier as in claim 8 including another conduit extending along an axis and for containing electroviscous fluid, a fourth means for promoting turbulent flow in electroviscous fluid flowing in said other conduit, a fifth means for promoting laminar flow in electroviscous fluid flowing in said other conduit toward said fourth means, said fifth means being spaced from and being disposed on the upstream side of said fourth means within said conduit, a sixth means for promoting laminar flow in electroviscous fluid flowing in said other conduit toward said fourth means, said sixth means being spaced-apart from said fourth means and being located on the opposite side of said fourth means from said fifth means, means for selectively establishing a voltage difference between said fourth means and said fifth means or between said fourth means and said sixth means in synchronism respectively with the establishment of said voltage difference between said first means and said second means and with the establishment of said voltage difference between said first means and said third means, and means for connecting said other conduit to said driving means and in which said driving means subjects said electroviscous fluid in said conduits to pulsating pressure.